United States Patent [19]
Davis

[11] 3,990,333
[45] Nov. 9, 1976

[54] METHOD OF FORMING A FILTER BY DIE-CUTTING

[75] Inventor: Maurice Davis, Croydon, England

[73] Assignee: Davis Industrial (Filters) Ltd., Surrey, England

[22] Filed: Nov. 10, 1975

[21] Appl. No.: 630,407

[52] U.S. Cl. .................................. 83/55; 83/13; 83/1; 83/679; 83/684; 55/521
[51] Int. Cl.² ........................................ B26F 1/44
[58] Field of Search............. 55/521, 522, DIG. 13; 210/496, 493; 83/1, 13, 679, 681, 683, 684, 692, 55

[56] References Cited
UNITED STATES PATENTS

| | | | |
|---|---|---|---|
| 3,281,513 | 10/1966 | Stripp et al. .......................... | 55/502 |
| 3,402,232 | 9/1968 | Rusha ..................................... | 83/8 |
| 3,766,629 | 10/1973 | Lechtenberg ........................ | 55/522 |

FOREIGN PATENTS OR APPLICATIONS 1,916,155   1/1970   Germany ............................. 55/521

*Primary Examiner*—J. M. Meister
*Attorney, Agent, or Firm*—Scrivener Parker Scrivener and Clarke

[57] ABSTRACT

A method and apparatus for cutting resilient foamed synthetic plastics filter material by pressing a die against a block of such material to provide cuts which are interleaved extending from opposite faces of the block the cuts at each such face being joined by a curved cut conforming to the desired exterior surface shape of the cut block when it is stretched to provide a corrugated configuration.

3 Claims, 4 Drawing Figures

METHOD OF FORMING A FILTER BY DIE-CUTTING

This invention relates to filters, and more particularly to improvements in and relating to filters for gases.

It is known to provide filter elements made from foamed synthetic plastics material, the cells of which are in communication with one another. Such filter elements may be used for filtering gases, for example air.

The rate of flow of gas which will pass through a filter element of foamed plastics depends on the thickness of the plastics and on the surface area of the plastics. To provide a compact filter element capable of passing a large volume of gas per unit of time it is known to provide a rectangular filter element of sheet foamed plastics material which is held in corrugated configuration by end elements, also of foamed synthetic plastics, secured to the two opposite edges of the main body between which each corrugation extends. Another example is an annular filter element having a corrugated annular body, the ridges of the corrugations being parallel to the axis of annulus and terminating in annular end elements of the same material.

It has been found that when corrugated filter elements are fabricated by bending flat sheets of foamed plastics, the resulting filter element does not satisfactorily pass gas through the region of the apex of each corrugation. This may be attributed to the fact that the bending of the flat sheet at a sharp angle closes the foam cells at the inside of the bend and stretches the foam cells at the outside of the bend with the result that no fluid flow passage is defined through the foam in the region of the bend.

Further, the fabrication of currugated filter elements from flat sheets of foamed plastics is unsatisfactory since the filter element must be constrained to stay in its corrugated form to prevent the resilience of the foamed plastics from causing the element to return to flat form. Hence the end elements secured by adhesive to the corrugated portions of the filter. Securing the end elements is time consuming and the resultant filter element is bulky and difficult to pack.

The difficulties associated with fabricating corrugated filter elements from flat sheets may be overcome by cutting the corrugated part of the filter element full size from a large block of foam. Such cutting may, for example, be by hot wire cutting.

This method of making filter elements is not, however, entirely satisfactory since, especially in the case of annular filter elements, it results in the production of large amounts of off-cuts of foamed plastics which are of little or no value. This will be easily appreciated if one considers the problem of cutting a plurality of identical annular elements from a large parallelapiped block. Both the parts lying between the elements and the centres of the elements are waste. If the annular elements are thin walled, this waste may amount to a very large proportion of the block. Further, hot wire cutting techniques are generally unsatisfactory since they are liable to result in sealing of the cut surface of the foam, with consequent reduction in filtering efficiency.

It has been proposed to fabricate a corrugated filter element by slitting a block of foamed plastics with rotating knives or hot wires to produce two series of parallel cuts. Each series of cuts extends inwardly from a respective face of a block in interleaved relationship with the other series, so that the block may be stretched concertina fashion to produce a corrugated filter element. In an element so produced, however, the apex of each corrugation is broad and flat or even concave in section when the unit is tensioned to open the cuts to provide the corrugations. This profile results in a substantial flat area being the sum of the flat apices and sharp angles at the edges of the flat apices. Further, as the cuts are opened out under tension, the foam in the central area of each apex is compressed thereby inhibiting fluid flow.

According to the present invention there is provided a method of making a corrugated filter element comprising the step of pressing a block of foamed synthetic plastics material, the cells of which intercommunicate, against a die having a series of first cutting knives, a series of second cutting knives, the knives of the first series and second series being interleaved, and the ends of adjacent first cutting knives remote from the second knives being joined by a curved third knife having between each pair of first knives a concave form directed toward and spaced from the second knife between that pair of first knives.

Preferably, a curved fourth cutting knife extends between the adjacent ends of each pair of adjacent second cutting knives remote from the or each third cutting knife.

According to the present invention, there is provided also a block of foamed synthetic plastics material cut to form a filter element, the block including a plurality of first cuts extending into the block from one face thereof, each pair of adjacent first cuts being interconnected at said one face by an outwardly convex surface, and a plurality of second cuts extending into the block from the opposite face thereof, the first and second cuts being interleaved.

According to the present invention there is further provided a die for cutting a parallelapiped foamed synthetic plastics filter material, the die comprising a plate from a face of which projects a series of first parallel knives interleaved with a series of parallel second knives, the ends of adjacent first knives remote from the second knives being joined by a third knife which between each pair of adjacent first knives is concave toward and spaced from the second knife therebetween.

Preferably each pair of adjacent second cuts is interconnected at said opposite face by a curved surface.

In order that the present invention may be well understood there will now be described some embodiments, given by way of example only, reference being had to the accompanying drawings wherein.

Figure 1:
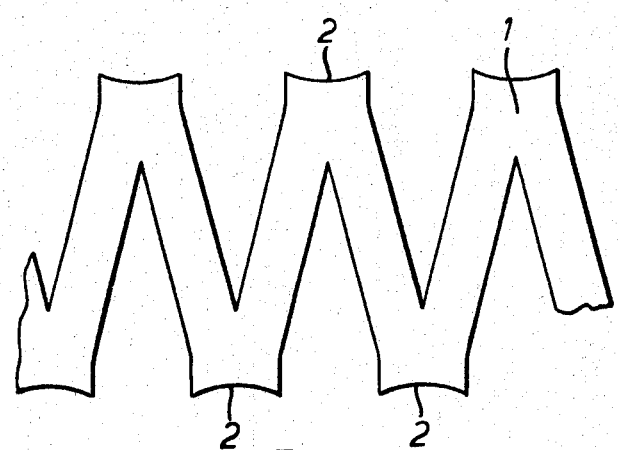
FIG. 1 shows a prior art filter element formed by saw cutting a block of foamed synthetic plastics.

A known filter element 1 shown in FIG. 1 is formed by cutting, for example with rotating knives, two series of parallel cuts in a parallelapiped block of foamed plastics material. One series of cuts extends into the block from one face in interleaved relation with the other series of cuts which extends into the block from the opposite face. The cut block is tensioned to open the cuts to provide the "corrugated" element 1. When the block is stretched, each pair of adjacent portions which are united on one face of the block and separated by a cut on the other face, form an apex 2 of the corrugations. Because the adjacent portions are initially parallelapiped, parallel and, where they are integral, broad the stretching results in deformation of the surface of the apex to a concave form. Along the central region of each apex parallel with the corrugations, the material is compressed which closes the cells and inhibits flow therethrough. Also the resultant shape of concave apices and sharp edges along the parallel sides of the apices are not conducive to good air flow.

Figure 2:
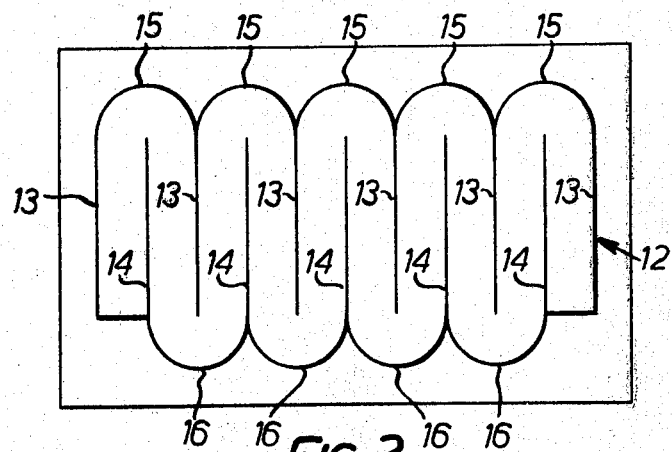
FIG. 2 shows a cutting die suitable for making a filter element.
Figure 3:
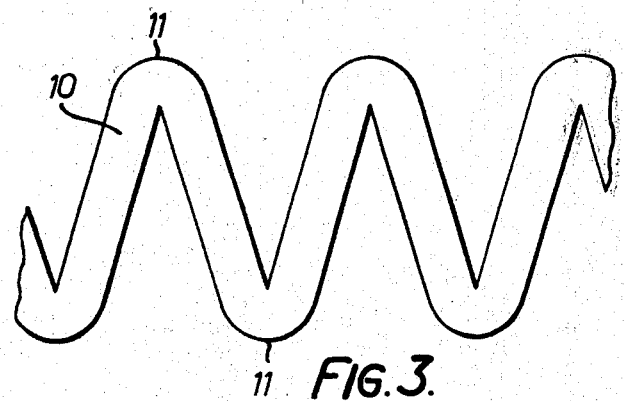
FIG. 3 shows a filter element cut using the die of FIG. 2.

The filter element 10 shown in FIG. 3 does not suffer from the disadvantages of the element 1 of FIG. 1. The element 10 has curved apices 11 to the corrugations to promote air flow over the element and does not suffer from the compression of the foam in the central region of apices. The element 10 of FIG. 3 is formed by stretching concertina fashion a block of foam cut using the die 12 shown in FIG. 2.

The die 12 comprises a plurality of blades or cutting knives set in a suitable support, e.g. a piece of wood. The blades may project, for example, ⅛ inch from the surface of the block.

The die 12 includes a series of first cutting knives 13 and a series of second cutting knives 14. The second knives 14 are interleaved with the first knives 13. The first and second knives 13, 14 are parallel, of equal length and the ends of adjacent first knives, remote from the second knives are joined by a curved knife 15. The ends of adjacent second knives 14 remote from the third knives 15 are interconnected by a curved fourth knife 16.

To cut a block of foam using die 12 the die is mounted in a suitable press and pressed on to a block of foamed synthetic plastics material. The block of foamed plastics is advantageously supported on a plate of polypropylene. When sufficient pressure is applied to the die it will cut through the block of foamed plastics.

Figure 4:
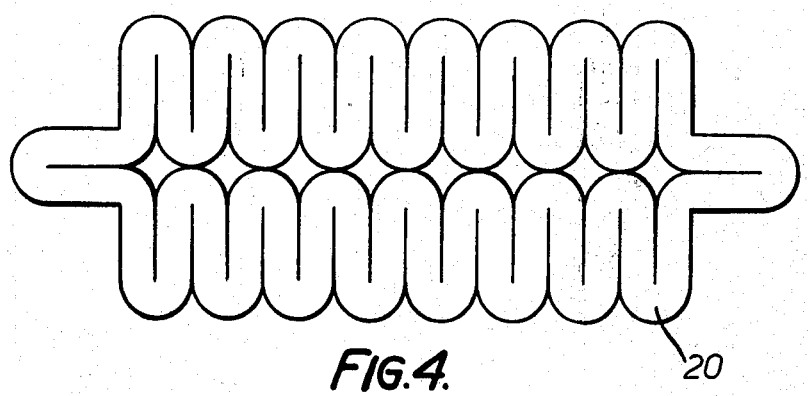
FIG. 4 shows a block of foam cut to make an annular corrugated filter element.

A suitably shaped die of the above described type may be used to cut the block 20 shown in FIG. 4. The block 20 may be stretched to form an annular filter element having a corrugated wall. The die would include two series of first knives and second knives, the fourth knife of each series being back-to-back with the other fourth knife, with their concave portions oppositely directed. The second knives would all be received between first knives while the outermost first knives of each series would each be joined at its end nearest the other series by an end knife which, with an associated intermediate knife would cut the connecting portion of the block which will connect the parts of the block cut by the first series and the second series of knives.

The above described method enables a block which may be stretched to form a currugated filter element to be cut from a block of foamed plastics material quickly and with a minimum of waste. The blocks so cut are compact and easily packed and stored. The filter elements produced by stretching the blocks have curved apices to their corrugations for good air flow and compression at the apices as to interfere with flow is much reduced.

I claim:

1. A method of making a corrugated filter element comprising the step of pressing a block of foamed synthetic plastics material, the cells of which intercommunicate, against a die having a series of first cutting knives, a series of second cutting knives, the knives of the first series and second series being interleaved, and the ends of adjacent first cutting knives remote from the second knives being joined by a curved third knife having between each pair of first knives a concave form directed toward and spaced from the second knife between that pair of first knives.

2. A method according to claim 1 in which the ends of adjacent second knives remote from the first knives are joined by a curved fourth knife, having between each pair of second knives a concave form directed toward the first knives.

3. A method according to claim 2 in which there is a first and second series of first knives and of second knives, the fourth knife of the first series and the fourth knife of the second series being back-to-back and having their concave parts oppositely directed, the knives of each second series all being received between adjacent first knives of the associated series and the innermost end of each outermost first knife of each series being connected to the innermost end of the adjacent outermost first knife of the other series by an end knife which with an associated intermediate knife will cut a connection integral with the portions cut by the first and second series of first, second, third and fourth knives.

* * * * *